United States Patent
Shi et al.

(10) Patent No.: US 11,798,017 B2
(45) Date of Patent: *Oct. 24, 2023

(54) DYNAMIC INFORMATION PROBING FOR CLASSIFYING AN ITEM

(71) Applicant: PayPal, Inc., San Jose, CA (US)

(72) Inventors: Meng Shi, San Jose, CA (US); Chetan S. Desai, Saratoga (CA); Suraj Belavalgidad, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/533,108

(22) Filed: Nov. 22, 2021

(65) Prior Publication Data

US 2022/0084054 A1 Mar. 17, 2022

Related U.S. Application Data

(63) Continuation of application No. 16/371,963, filed on Apr. 1, 2019, now Pat. No. 11,182,809.

(51) Int. Cl.
*G06Q 30/02* (2023.01)
*G06Q 30/0203* (2023.01)
*G06Q 30/0201* (2023.01)
*G06Q 20/40* (2012.01)
*G06F 16/901* (2019.01)
(Continued)

(52) U.S. Cl.
CPC ....... *G06Q 30/0203* (2013.01); *G06F 16/906* (2019.01); *G06F 16/9027* (2019.01); *G06F 40/205* (2020.01); *G06Q 20/40* (2013.01); *G06Q 30/0201* (2013.01)

(58) Field of Classification Search
CPC .............. G06Q 30/02; G06Q 30/0201; G06Q 30/0203; G06Q 20/40; G06F 40/205; G06F 16/9027; G06F 16/906
See application file for complete search history.

(56) References Cited

U.S. PATENT DOCUMENTS

| 2012/0066253 | A1 | 3/2012 | Osborn et al. |
| 2014/0379524 | A1* | 12/2014 | Grimaud ................. G06T 13/20 |
| | | | 705/26.7 |
| 2016/0307283 | A1 | 10/2016 | Melzer et al. |

(Continued)

OTHER PUBLICATIONS

Ricci F., et al., "Product Recommendation With Interactive Query Management and Twofold Similarity," Springer-Verlag, Berlin, Heidelberg, 2003, 15 pages.

*Primary Examiner* — William S Brockington, III
(74) *Attorney, Agent, or Firm* — Haynes and Boone, LLP

(57) ABSTRACT

Methods and systems are presented for classifying an item by dynamically probing different consumers for information related to the item. A description of the item may be parsed to identify a set of questions related to the item for probing consumers for additional information related to the item. The set of questions may be stored in a random forest associated with the item. The random forest may be traversed to select one or more subset of questions for probing a consumer for additional information. Once answers are obtained from a consumer based on the probing, the answers may be compiled with other answers stored in the random forest obtained from other consumers. The compiled answers may be used to generate an item classification for the item and may also be used to modify the random forest.

20 Claims, 6 Drawing Sheets

(51) Int. Cl.
    *G06F 16/906* (2019.01)
    *G06F 40/205* (2020.01)

(56) References Cited

U.S. PATENT DOCUMENTS

2017/0116658 A1  4/2017  Baid et al.
2018/0373965 A1  12/2018 He
2019/0287018 A1  9/2019  Coupe et al.
2019/0304445 A1  10/2019 Nahamoo et al.

* cited by examiner

DYNAMIC INFORMATION PROBING FOR CLASSIFYING AN ITEM

CROSS REFERENCE TO RELATED APPLICATIONS

This application is a continuation of U.S. application Ser. No. 16/371,963, filed Apr. 1, 2019, and whose contents are hereby incorporated by reference in its entirety for all purposes.

BACKGROUND

The present specification generally relates to machine learning, and more specifically, to the use of machine learning for classifying an item by dynamically probing for information in real-time during an electronic interaction according to various embodiments of the disclosure.

RELATED ART

Item classification can be a problem for organizations that lack sufficient information to identify an item. For example, payment service providers, such as PayPal®, Inc., of San Jose, Calif., USA, that process purchase transactions of items between merchants and consumers may rely on descriptions provided by the merchants in order to classify and/or identify the items related to the purchase transactions. Accurate classification and/or identification of the items associated with the purchase transactions can be critical to the payment service providers as that information may affect risk analyses of the purchase transactions. For example, a purchase transaction may be authorized or denied based on the classification and/or identification of the item being purchased. Accurate classification of items may also help the payment service providers and/or the merchants to provide effective marketing, promotion, upselling, and/or cross-selling to consumers.

However, payment service providers that are independent and separate from the merchants do not have first-hand information regarding the items associated with the purchase transactions, and must often rely on the description of the item provided by the merchants. Unfortunately, the item descriptions provided by the merchants may be generalized without much detail or may even lack accuracy (e.g., including insufficient information for classifying and/or identifying the items). For example, the description may include fragmented descriptions due to length limitations, or the description may include promotional materials for the merchants rather than descriptive information of the items being sold. Thus, there is a need for accurately classifying an item based on insufficient information.

Figure 1:
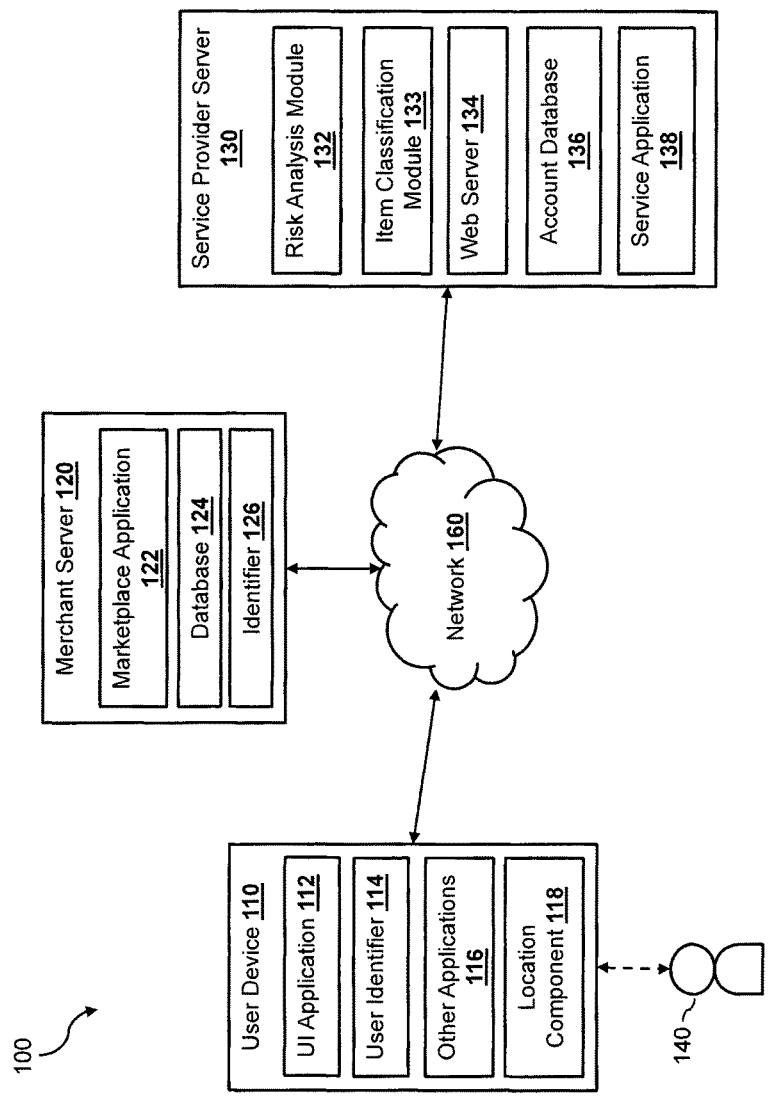
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for classifying an item by dynamically probing different consumers for information related to the item in real-time using machine-learning. As defined herein, classifying an item may include associating the item with a particular item category (e.g., a Kingston 32 GB memory, etc.) or associating the item to a specific item identifier (e.g., a universal product code (UPC), etc.). As discussed above, a payment service provider may rely on accurate classifications of items for assessing a risk of one or more payment transactions. However, a payment service provider that facilitates a payment transaction between a third-party merchant and a consumer may not have direct access to information of an item associated with the payment transaction, and may have to rely on a description of the item provided by the third-party merchant. Unfortunately, the descriptions provided by merchants often lack sufficient information to accurately classify and/or identify the items. For example, an example item description provided by a merchant may include the word "memory," but does not indicate a type of memory (e.g., a random access memory (RAM) or a read only memory (ROM), etc.), a size of the memory (e.g., 2 gigabytes, 16 gigabytes, etc.), a purpose (e.g., intended use) for the memory (e.g., used in a Windows® desktop, used in a Mac® laptop, etc.), or other specific information. As such, the payment service provider is unable to accurately classify and/or identify the item based solely on the description provided by the merchant.

Thus, according to various embodiments of the disclosure, a machine-learning based item classification system may dynamically probe one or more consumers who purchased the same item from the merchant for information related to the item. The item classification system may then use the information collectively obtained from the one or more consumers to generate an item classification. In some embodiments, based on the description of the item provided by the merchant, the item classification system may generate and/or obtain a set of questions for probing the one or more consumers for information related to the item. The questions generated and/or obtained for the item may be related to one or more aspects of the item. Using the example of the item described above having a description of "memory," one or more questions may be generated that relate to the size of the memory, one or more questions may be generated that relate to a type of memory, one or more questions may be generated that relate to an intended usage of the memory, and so forth. Generating questions that are related to different aspects of the item may be advantageous as information collected from consumers that is related to different aspects of the item may enable the item classification system to more accurately classify the item for purposes of risk assessment, marketing, up-selling, cross-selling, etc.

Furthermore, due to the limited attention span of regular consumers and the possibly large number of questions generated for the item (e.g., 50, 100, etc.), the item classification system may advantageously select only one or more (but not all) subsets of questions for probing a consumer, where each subset of questions is related to a distinct aspect of the item. This way, a single consumer would not be overburdened by the probing, and the item classification system may focus on probing multiple consumers for information related to different aspects of the item.

Upon receiving a payment transaction request for purchasing the item by a first consumer, the item classification system may first determine whether the description associated with the item (e.g., provided by the merchant) satisfies certain description criteria. Although the information probing may be performed during the processing of the payment transaction, it can also be done after the payment transaction is completed. Probing the consumer for additional information during the processing of the payment transaction is beneficial as it receives a higher response rate and accuracy of information received from the consumer. The description satisfies the description criteria if the item classification system can classify the item (e.g., associating the item with a particular predetermined item category or an item identifier) without any additional information. If the item classification system determines that the description does not satisfy the description criteria, the item classification system may probe the first consumer for information related to the item. For example, the item classification system may select at least a first subset of questions associated with a first aspect of the item for probing the first consumer. In some embodiments, the item classification system may select the first subset of questions from the different subsets of questions for probing the first consumer based on a set of rules. For example, the item classification system may select the subset of questions in a particular order (e.g., selecting a first subset for probing a first consumer, selecting a second subset for probing a second consumer, and so forth). In some embodiments, the item classification system may randomly select (e.g., use a randomization algorithm) the subset of questions for probing the first consumer. One benefit of randomly selecting the subset of questions is that the subsets of questions may be selected more evenly, especially when the order (e.g., ranking) of the subset of questions have not yet determined and/or the number of consumers who may provide answers to the questions is relatively small compared to the number of subsets (e.g., the number of consumers is less than the number of subsets, the number of consumers is less than 5 times of the number of subsets, etc.).

The item classification system may present the selected first subset of questions to the first consumer and obtain answers to the questions via an interface (e.g., an interface of the payment service provider). In some embodiments, the item classification system may then use the answers obtained from the first consumer (e.g., a consumer who provided usable answers, etc.) to generate an item classification for the item associated with the description.

As discussed above, the questions related to the item may include different subsets of questions related to different aspects of the item. Thus, in some embodiments, the item classification system may compile answers obtained from different consumers who purchased the same item for generating the item classification. For example, upon receiving another payment transaction request for purchasing the same item by a second consumer, the item classification may again select a subset of questions associated with an aspect of the item for probing the second consumer. As discussed herein, the subset of questions selected for probing the second consumer may be selected based on a particular order, or selected randomly. Using either method, the subset of questions selected for probing the second consumer may be the same as the subset of questions selected for probing the first consumer (e.g., the first subset of questions) or may be a different subset (e.g., a second subset of questions).

In some embodiments, when the subset of questions is selected randomly, the item classification system may assign weights to the different subsets of questions such that one subset of questions having a higher weight may have a higher chance of being selected than another subset of questions having a lower weight. For example, the item classification system may assign a lower weight to a subset of questions that have previously been asked to one or more consumers and for which answers have been obtained from the one or more consumers. In some embodiments, the more times that the subset of questions have been asked and answered, the lower the weight is assigned to the subset (e.g., reducing the weight by a multiplication of a certain predetermined percentage, such as 2%, 4%, etc. in proportion to the number of times the subset of questions have been asked and answered). This way, the subsets of questions that have not been asked to any consumers before, and/or that have been asked in fewer instances, may have a higher chance of being selected.

Once a subset of questions for probing the second consumer is selected, the item classification system may present the selected subset of questions to the second consumer and obtain answers to the questions via the interface. The item classification system may then compile the answers obtained from the different consumers (e.g., the first consumer and the second consumer), and generate the item classification and based on the compiled answers. When the subset of questions selected for probing the second consumer is different from the subset of questions selected for probing the first consumer, the answers obtained from the second consumer enriches the information obtained from the first consumer, as the compiled information becomes multi-dimensional (e.g., related to multiple different aspects of the item). On the other hand, when the questions selected for probing the first and second consumers are from the same subset of questions, the answers obtained from the first and second consumers may be used to verify against each other, and may strengthen the veracity of the answers. Thus, as the item classification system obtains more answers from different consumers, the additional answers may either add additional dimensions to the information used to classify the item or may strengthen the veracity of the answers previously obtained.

Different embodiments may use different data structures to store the questions for probing the consumers. In some embodiments, the item classification system may use a random forest to store the questions. The random forest comprises a root node and multiple trees from the root node, where each tree includes nodes corresponding to a subset of questions that are related to a particular aspect of an item. Thus, for a set of questions that include three different aspects, the random forest for the set of questions may include three different trees from the root node. One or more paths (e.g., branches) may be included in each tree, where the nodes in each path represents a sequence of questions for probing a consumer. As such, when a node can be branched out to multiple paths (e.g., multiple sub-branches), the item classification system may select the next node (e.g., the next question) for probing the consumer using one or more algorithms (e.g., based on a predetermined order, select randomly, based on the answers obtained from the consumer at the current node, etc.).

Each of the trees may also include a weight assigned to the tree by the item classification system. As discussed above, the weight may be determined based on whether (or how many times) that particular tree has been traversed (selected to probe a consumer and obtain answers). In some embodiments, the answers obtained from one or more consumers may also be stored in the corresponding nodes, such that when a new answer for a particular node is obtained from a consumer, the new answer may be verified by comparing against the answer(s) already stored in the node. In some embodiments, when a particular node may lead to two or more other nodes (e.g., branches out to two or more possible paths), the item classification system may select a next node to traverse based on the comparison between the answer obtained from the consumer and the answer(s) stored at the corresponding node.

Once one or more of the trees have been traversed (e.g., answers to the questions corresponding to the nodes in the trees have been obtained), the item classification system may use the answers stored in the random forest to generate an item classification.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to access account services or conduct electronic transactions (e.g., account transfers or payments) with the service provider server 130. Similarly, a merchant associated with the merchant server 120 may use the merchant server 120 to log in to a merchant account to access account services or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to conduct electronic transactions (e.g., online payment transactions, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., an international mobile equipment identity (IMEI), a media control access (MAC) address, etc.), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request (e.g., a checkout request), a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained (with the user's consent) by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130. In some embodiments, the service provider server 130 may also include an application server that provides content and interactions with users in a similar manner as the web server 134, but instead through an application that is not a web server (e.g., a mobile application associated with the service provider, etc.) via native API calls.

In various embodiments, the service provider server 130 includes a risk analysis module 132 that is configured to determine whether to authorize or deny an incoming request from the user device 110 or from the merchant server 120. The request may be a log-in request, a fund transfer request, a request for adding an additional funding source, or other types of requests associated with the variety of services offered by the service provider server 130. As such, when a new request is received at the service provider server 130 (e.g., by the web server 134), the risk analysis module 132 may analyze (or evaluate) the request and determine whether the request is a legitimate request or a fraudulent request based on information available to the risk analysis module (e.g., attributes of the request). The risk analysis module 132 may transmit the result of the analysis (e.g., whether the request is a legitimate request or a fraudulent request) to the web server 134 and/or the service application 138 such that the web server 134 and/or the service application 138 may process (e.g., approve or deny) the request based on the indication.

The service provider server 130 may also include an item classification module 133 that implements the item classification system as discussed herein. In some embodiments, the item classification module 133 may receive a description of an item (e.g., from the risk analysis module based on a purchase transaction request, etc.) and may generate an item classification (e.g., a particular item category, a particular item identifier, etc.) based on the description. In particular, the item classification module 133 may work with the web server 134 and/or the service application 138 to probe different consumers who purchase the item for additional information, and may use the additional information to classify the item. The item classification module 133 may then transmit the generated item classification to the risk analysis module 132 such that the risk analysis module 132 can use the classification to assess the risk of the purchase transaction. In some embodiments, the item classification module 133 may also associate the generated item classification with a record (e.g., a transaction record for the consumer, etc.) for the corresponding purchase transaction such that other applications of the service provider server 130 may subsequent use such information for purposes such as marketing, cross-selling, up-selling, etc. for the consumer.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to classify a request and determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
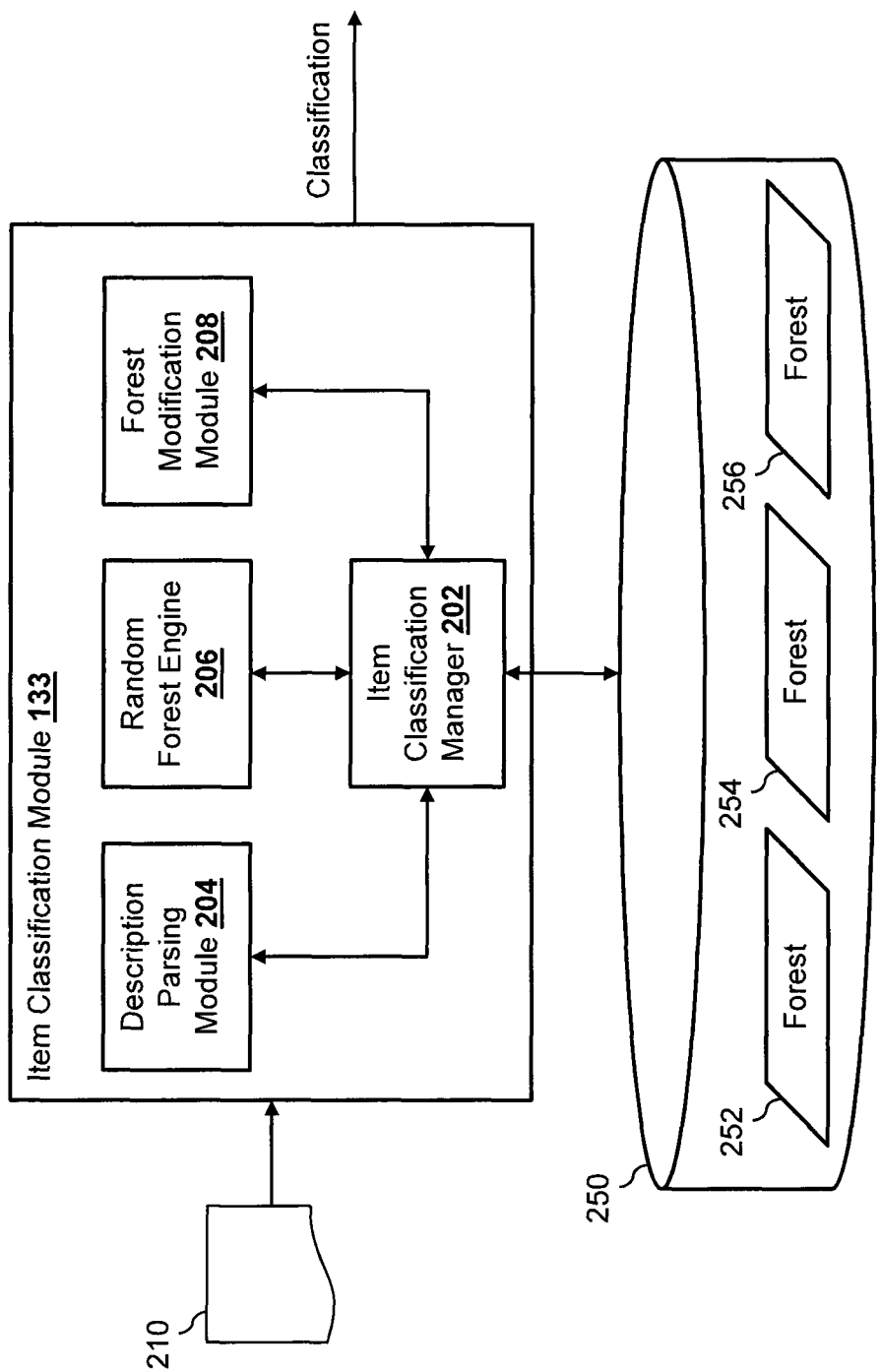
FIG. 2 is a block diagram illustrating an item classification module according to an embodiment of the present disclosure.

FIG. 2 illustrates a block diagram of the item classification module 133 according to an embodiment of the disclosure. The item classification module 133 includes an item classification manager 202, a description parsing module 204, a random forest engine, and a forest modification module 208. When the item classification module 133 receives a description 210 (e.g., provided along with a purchase request) of an item, the item classification manager 202 may use the description parsing module 204 to parse the description 210. Based on the parsing of the description 210, the description parsing module 204 may determine whether the description 210 satisfies one or more predetermined criteria (e.g., whether the item classification module 133 can classify the item based on the description 210 alone, etc.). Details about how to determine whether the description 210 satisfies the one or more predetermined criteria are described below. If it is determined that the description 210 does not satisfy the one or more predetermined criteria, the item classification manager 202 may select one of the forests (e.g., forests 252, 254, and 256, etc.) stored in a forest database 250 for use in probing a consumer for information about the item. Each forest may include one or more trees and multiple paths that traverse any one of the trees. Each path may include nodes corresponding to different questions that the item classification manager may use to probe a consumer. The random forest engine may use one or more techniques to select which path to choose for probing the consumer. In some embodiments, based on one or more answers obtained from the consumer, the item classification manager 202 may re-route the path within the forest and/or modify the forest. The item classification manager 202 may compile answers obtained from one or more consumers by traversing different portions of the forest and may use the compiled answers to generate an item classification.

Figure 3:
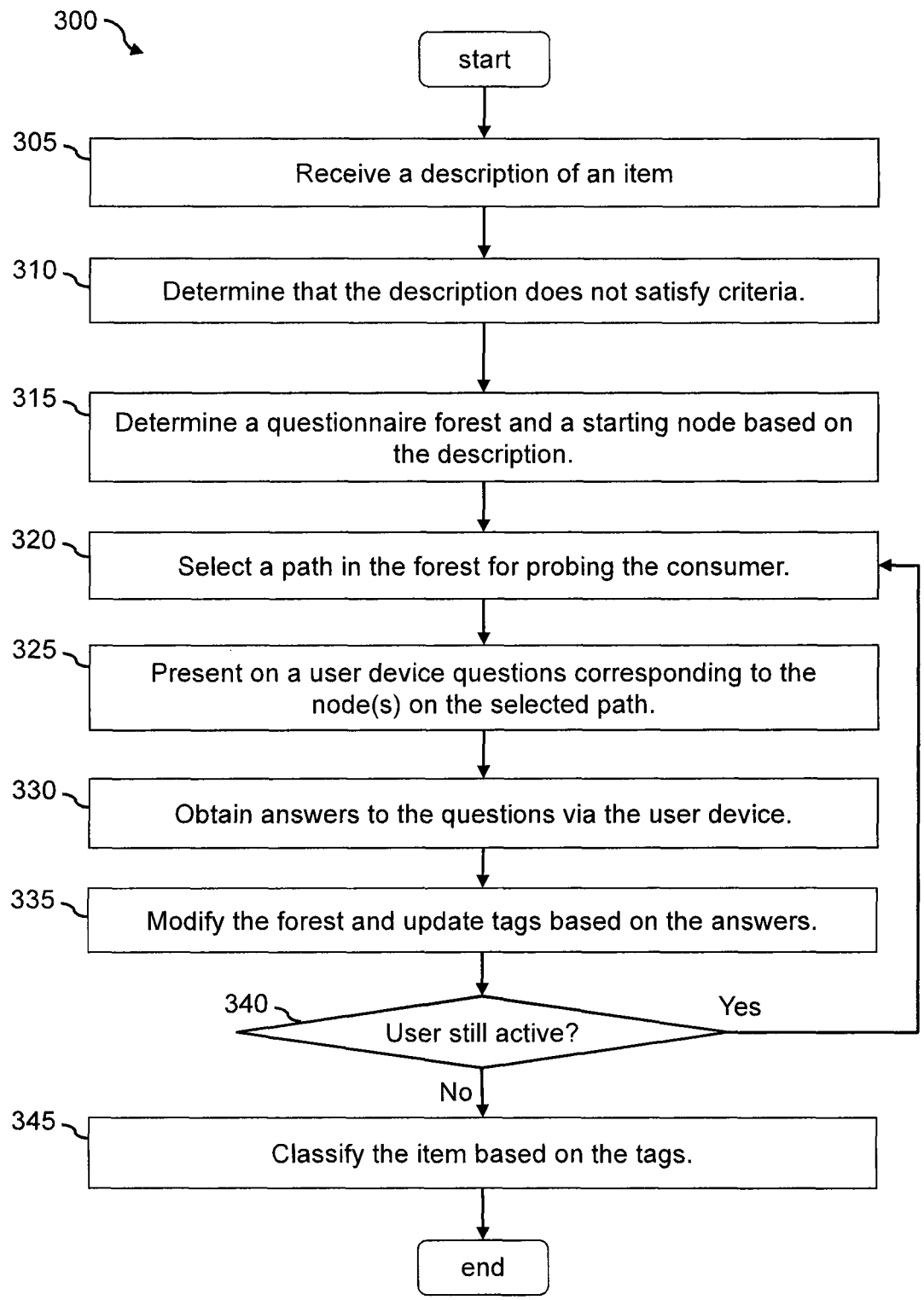
FIG. 3 is a flowchart showing a process of classifying an item according to an embodiment of the present disclosure.
Figure 4:
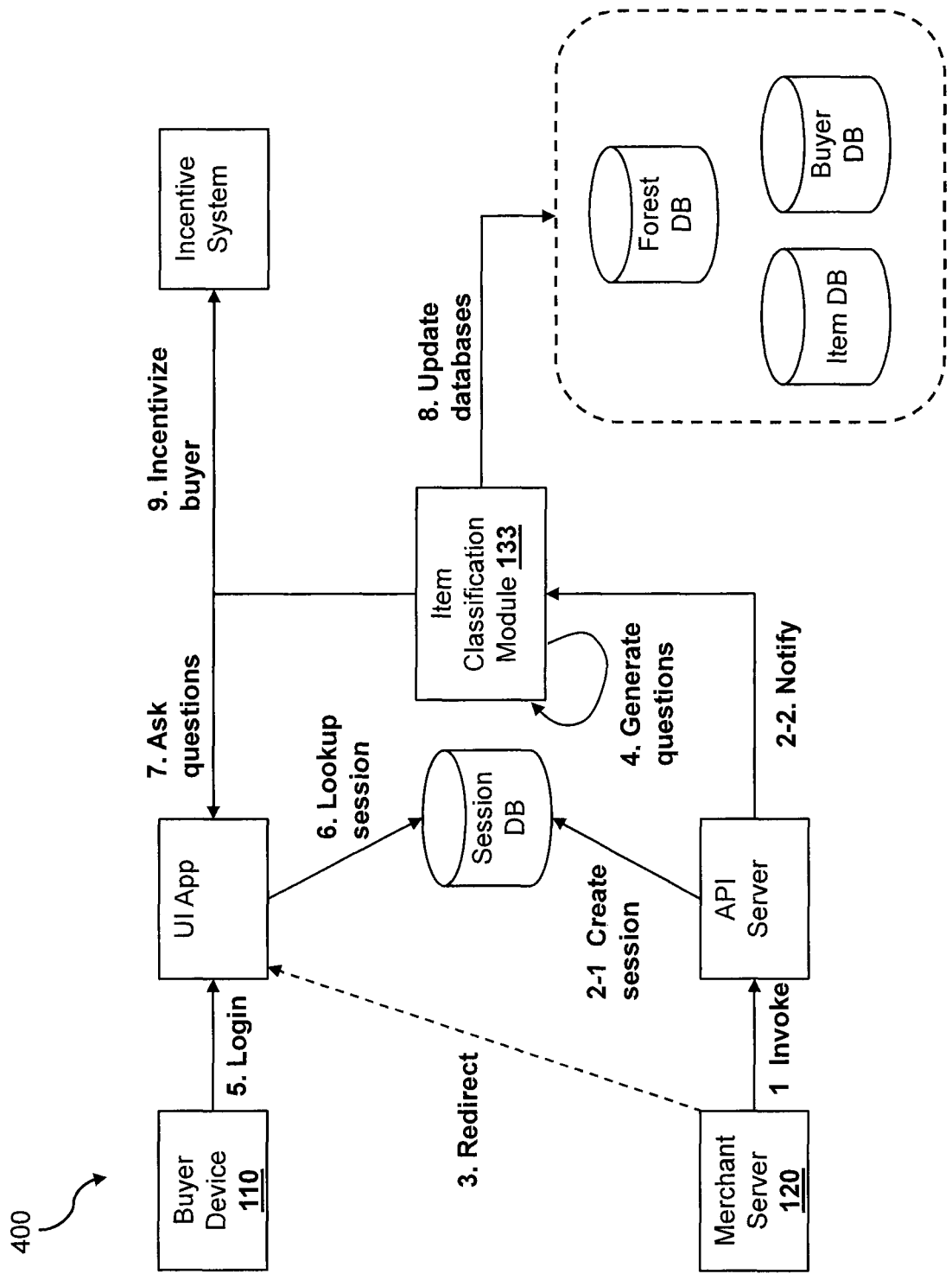
FIG. 4 illustrates an exemplary information flow for classifying an item according to an embodiment of the present disclosure.

FIG. 3 illustrates a process 300 for classifying an item according to an embodiment of the disclosure. In some embodiments, the process 300 may be performed by the item classification module 133 of the service provider server 130. The process 300 begins by receiving (at step 305) a description of an item. For example, the description of the item may be transmitted from the risk analysis module 132 upon receiving a purchase transaction request at the service provider server 130. FIG. 4 illustrates an exemplary information flow 400 of processing a purchase transaction request when the purchase transaction request is initiated at a website of a merchant. A user, such as the user 140, may browse a website of a merchant (e.g., hosted by the merchant server 120) or using the UI application 112. As the user 140 initiates a checkout process via the merchant website, the merchant server 120 may invoke an application programming interface (API) of a payment service provider (e.g., the service provider server 130) to initiate a purchase transaction process. By invoking the API, the merchant server 120 may also provide information related to the purchase transaction to the service provider server 130. Alternatively, the UI application 112 may be a mobile application associated with the payment service provider, and the user 140 may use the UI application 112 to perform an in-store checkout with the merchant at the merchant store. The UI application 112 (e.g., the mobile application) may be in communication with a device of the merchant (e.g., a point-of-sale device), and may receive information related to the purchase transaction via the merchant device. For example, the merchant server 120 may provide an amount, a description of the item(s)

being purchased, and a shipping address to the service provider server 130. The service provider server 130 may then create a new session for the purchase transaction and may redirect the user 140 from the website of the merchant to a website hosted by the service provider server 130 (e.g., by the web server 134). At this point, the user 140 may login to an account with the service provider via the website of the service provider.

The process 300 then determines (at step 310) whether the description provided by the merchant satisfies one or more predetermined criteria. For example, the item classification manager 202 may use the description parsing module 204 to parse the description (e.g., the description 210) obtained from the merchant server 120. Based on the parsing of the description 210, the item classification manager 202 may determine that the description 210 includes only the word "memory." The item classification manager 202 may then determine that the description 210 does not satisfy the one or more predetermined criteria as the item classification manager 202 cannot classify the item into one of the many predetermined classifications based solely on the description 210.

In some embodiments, the item classification manager 202 may use a classification model (not shown) to determine a classification of an item. The classification model is a computer-based model (e.g., an artificial neural network, etc.) that takes one or more inputs (e.g., words that describe an item, attributes of the item, etc.) and produces an item classification and a probability indicating the likelihood that the item is associated with the item classification. In such an example, the one or more predetermined criteria may include a criterion that the item classification produced by the classification model has at least a threshold probability (e.g., 80%, 90%, etc.). As such, if it is determined that the probability is below the threshold based on the description alone, the item classification manager 202 may determine that the description does not satisfy the one or more criteria. In some embodiments, the item classification manager 202 may determine whether the description satisfies the one or more criteria based on a number of keywords obtained from the description (e.g., whether the number of keywords reach a predetermined threshold, etc.).

The process 300 then determines (at step 315) a forest based on the description. In some embodiments, questions related to different item types may be pre-generated and stored in the forest database 250. As discussed herein, the item classification module 133 may use a specific data structure, such as a random forest, for storing the questions, such that questions related to a particular item type may be stored in a distinct forest. As shown in FIG. 2, the forest database 250 includes three different forests 252, 254, and 256, where each corresponds to a different item type. For example, the forest 252 may correspond to a "computer memory" item type, the forest 254 may correspond to a "television" item type, and the forest 256 may correspond to a "mobile phone" item type. Although only three forests are shown to be included in the forest database 250, any number of forests can be stored in the forest database 250 based on the number of item types desired to be covered. Thus, the item classification manager 202 may select a forest from the forests stored in the forest database 250 based on the description 210, an identity of the merchant, and/or a product category associated with the item (e.g., provided by the merchant in the description 210). In this example, based on the description "memory," the item classification manager 202 may select the forest 252 that corresponds to the "memory" item type. In some embodiments, the item classification module 133 may assign a unique identifier for each item (e.g., each identifier corresponds to a particular product from a particular merchant). For example, the identifier may be generated based on a combination of a product ID provided by the merchant and a merchant ID associated with the merchant. When a description of an item is received (at the step 305), the item classification module 133 may determine the item identifier for the item and may determine whether a forest has been created and/or instantiated for the item. If no forest has been created and/or instantiated for the item, the item classification module 133 may create and/or instantiate a forest for the item. However, if a forest has already been created and/or instantiated for the item, the item classification module 133 may retrieve the forest (e.g., the forest 252) from the forest database 250.

Figure 5:
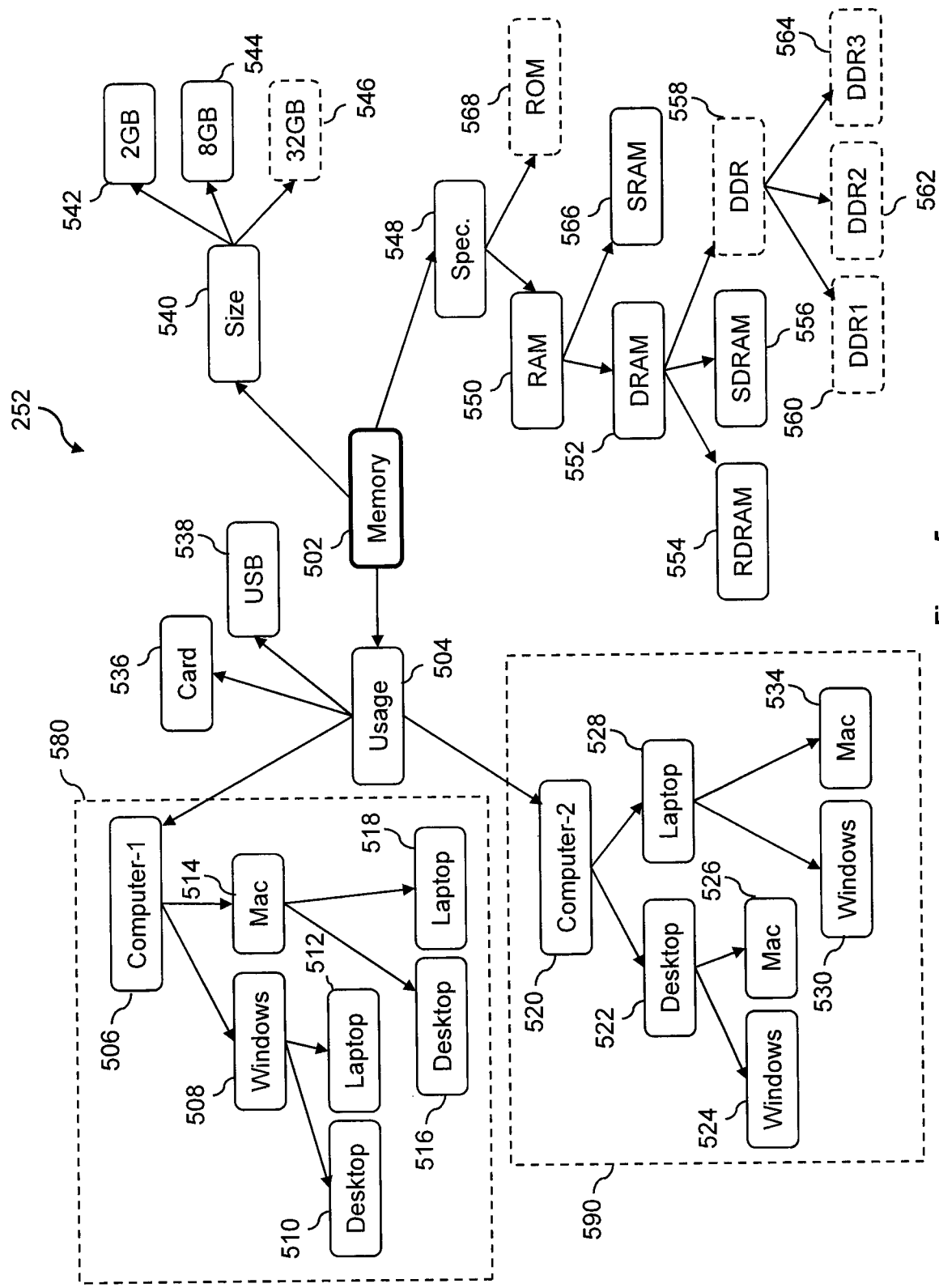
FIG. 5 illustrates a random forest according to an embodiment of the present disclosure.

FIG. 5 illustrates an example structure of the forest 252 corresponding to the "memory" item type. As shown, the forest 252 has a root node 502. From the root node 502, the forest 252 branches out into three different trees—a first tree including nodes 504-538 (the node 504 is also referred to as a tree root of the first tree), a second tree including nodes 540-546 (the node 540 is also referred to as a tree root of the second tree), and a third tree including nodes 548-568 (the node 548 is also referred to as a tree root of the third tree). As shown, each of the trees may include one or more paths of connecting nodes through which the random forest engine 206 may traverse to a leaf node. As discussed herein, the questions generated and/or obtained for a particular item type may correspond to different aspects of the item type. For example, for the "memory" item type, some questions may correspond to the usage aspect, some questions may correspond to the size aspect, and some questions may correspond to the specification aspect. Thus, each of the trees in the forest 252 may correspond to a different aspect of the item type. For example, the first tree including the tree root 504 and the nodes 506-538 corresponds to the usage aspect of the memory item type, the second tree including the tree root 540 and the nodes 542-546 corresponds to the size aspect of the memory type, and the third tree including the tree root 548 and the nodes 550-568 corresponds to the specification of the memory type. At least some of the nodes in the trees include questions for probing a consumer. For example, the node 506 may include a question "is the memory being used for a computer?" and the node 506 may include a question "is the computer a PC?"

When the random forest engine 206 selects a forest (e.g., the forest 252), the random forest may begin traversing the forest 252 from the root node 502 until the random forest reaches a leaf node in the forest 252. As shown in the figure, the forest 252 may be traversed from the root node 502 via one of multiple paths to reach a different leaf node. For example, the random forest engine 206 may traverse the forest 252 via a path including the root 502, the tree root 504, the node 506, the node 508, and the leaf node 510. The random forest engine 206 may also traverse the forest 252 via a path including the root 502, the tree root 548, the node 550, the node 552, and the leaf node 556. Each of the paths include nodes that correspond to a series (e.g., a sequence) of questions for probing the consumer for information about the item. For example, the path that includes the root 502, the tree root 504, the node 506, the node 508, and the leaf node 510 may correspond to a series of questions including "is the memory for used in a computer?" (node 506), "does the computer use a Windows® operating system?" (node 508), and "is the computer a desktop computer?" (node 510). In another example, the path that includes the root 502, the tree root 548, the node 550, the node 552, and the leaf node 556 may correspond to a series of questions including "Is the memory a random access memory (RAM)?" (node 550), "is the RAM a DRAM?" (node 552), and "is the DRAM an SDRAM?" (node 556). It is noted that the questions can be generated in one of different types. As illustrated above, the questions correspond to the nodes in the forests can be a "yes/no" question type where the answers to the questions may be simply a "yes" or a "no." However, the questions can also be of other types, such as a multiple choice type. For example, instead of asking whether the memory is used in a computer running a Windows® operating system, the question may be "what operating system is installed in the computer in which the memory is used?" (for node 508) and the question may include different choices, such as "Windows®", "Mac®" or "Linux®" for the user to select.

The random forest engine 206 may first determine whether sufficient answers have been obtained from other users for the forest 252. For example, each node in the forest 252 that corresponds a question may also store a count indicating the number of times that the question has been asked and an answer has been obtained. The random forest engine 206 may determine that answers to the question in the corresponding node satisfy a threshold when the count reaches a predetermined threshold (e.g., 5, 10, etc.). When all of the nodes having questions include counts that reach the predetermined threshold, the random forest engine 206 may determine that no more probing is necessary, and may generate an item classification for the item based on the answers previously obtained and stored in the forest 252. However, if the count of at least one node in the forest 252 does not reach the predetermined threshold, the random forest engine 206 may traverse the forest 252 to probe the consumer for additional information related to the item.

Thus, the process 300 selects (at step 320) a path in the forest for probing the consumer. In particular, at each junction point in the forest 252 (e.g., at a node that connects to more than one node), the random forest engine 206 may select one of the connecting nodes to traverse. A connecting node is a node that is connected from a current node. For example, since the root 502 is connected to the tree roots 504, 540, and 548, the tree roots 504, 540, and 548 are all connecting nodes for the root 502, and the random forest engine 206 may select one of the three tree roots 504, 540, and 548 to traverse. By selecting one of the three tree roots 504, 540, and 548 to traverse, the random forest engine 206 selects a particular tree (a particular aspect of the item for questioning the consumer) from the three trees (from the three different aspects related to the item). The random forest engine 206 may iteratively select the next connecting node in the forest 252 until a leaf node is reached. The nodes selected by the random forest engine 206 collectively constitutes a path for probing a consumer. Thus, a path includes a sequence of nodes that indicate a subset of questions from the forest 252 and an order for presenting the subset of questions to the consumer 140.

Different embodiments may use different techniques to select the next node in the forest to probe the consumer. In some embodiments, the random forest engine 206 may select the next node from the different connecting nodes based on a pre-determined order. For example, since the root 502 is connected to the tree roots 504, 540, and 548, the random forest engine 206 may determine a particular order (e.g., 504-540-548), and sequentially select the tree root in the particular order each time the random forest engine 206 traverses the forest 252. Thus, when the random forest engine 206 traverses the forest 252 the first time, the random forest engine 206 may select the tree root 504 as the next node in the selected path. The random forest engine 206 finishes traversing the forest 252 when the random forest engine 206 reaches a leaf node (e.g., the leaf node 518). The next time (the second time) the random forest engine 206 traverses the forest 252, the random forest engine 206 may select the tree root 540 as the next node. The next time (the third time) the random forest engine 206 traverses the forest 252, the random forest engine 206 may select the tree root 548 as the next node. After cycling through the next nodes in the predetermined order, the random forest engine 206 may revert back to the first node in the order. Thus, the next time (the fourth time) the random forest engine 206 traverses the forest 252, the random forest engine 206 may select the tree root 504 again as the next node.

In some embodiments, instead of selecting the next connecting node based on a particular order, the random forest engine 206 may randomly select the next node. For example, the random forest engine 206 may use a randomization algorithm to select the next node. One of the benefits of randomly selecting the next node (e.g., a path) for traversing the forest is that the different paths (and therefore the different subsets of questions corresponding to the paths for probing the consumer) may be selected more evenly, especially when the order (e.g., the ranking) of the different paths (e.g., the different subset of questions for probing the consumer) is not yet determined and/or the number of consumers who may provide answers to the questions is relatively small compared to the number of paths (e.g., the number of consumers is less than the number of paths, the number of consumers is less than 5 times of the number of paths, etc.).

When a randomization algorithm is used to select the next node, the random forest engine 206 may configure the randomization algorithm to adjust the chance (e.g., the likelihood) that each of the connecting nodes is selected. For example, the random forest engine 206 may assign weights to at least some of the connecting nodes. When the weights assigned to the connecting nodes are the same, the connecting nodes have equal chance of being selected by the randomization algorithm. On the other hand, a connecting node having a larger weight may have a higher chance of being selected by the randomization algorithm than another connecting node having a smaller weight.

The random forest engine 206 may assign weights to different nodes based on one or more factors. In some embodiments, the random forest engine 206 may also assign (and adjust) weights to different nodes dynamically. For example, the random forest engine 206 may assign weights to the connecting nodes based on a number of times that the connecting nodes (and/or the paths including the connecting nodes) have been previously traversed by the random forest engine 206. This way, the nodes (and the paths) that are less traversed may have a higher chance of being selected than the nodes (and the paths) that are more traversed. The random forest engine 206 may store a value in each node indicating the number of times the node has been traversed. Thus, the weight (the value) assigned to a connecting node may be inversely proportional to the number of times that the node has been traversed (e.g., 1 divided by the number of times the connecting node is traversed, etc.) For example, based on the values stored in the nodes, the random forest engine 206 may determine that the nodes 546, 560, 562, 564, and 568 have never been traversed (as indicated by the dashed border). Since four nodes in the tree including nodes 548-568 have never been traversed, the random forest engine 206 may assign a higher weight to the tree including the nodes 548-568 than the other branches. The random forest engine 206 may also select the next connecting node based on other factors, such as an answer provided by the consumer 140, as described in more details below. As such, the random forest engine 206 may not need to assign weights to all of the nodes in the forest 252.

In addition to or instead of assigning weights based on the number of times that the connecting nodes have been traversed, the random forest engine 206 of some embodiments may assign weights to the connecting nodes based a quality of the answers stored in the downstream nodes. As the random forest engine 206 traverses a path in the forest 252, the random forest engine 206 may provide questions corresponding to the nodes in the path to the consumer, for example, via an interface presented on the user device 110. The random forest engine 206 may obtain answers to the questions via the interface, and may store the answers in the corresponding nodes (or associating the answers with the corresponding nodes). In some embodiments, the random forest engine 206 may determine a quality (e.g., a value in a range between 1 to 10, etc.) of the answers corresponding to a particular node and store the quality value in the particular node. For example, the random forest engine 206 may determine the quality of the answers based on whether the answers store in the node are consistent with each other. If the answers are consistent (e.g., matching) with each other, the node is given a higher quality score. More particularly, the higher the consistency (e.g., more answers in the node that are consistent with each other, such as 90%, 100%, etc.) the answers are in the node, the higher the quality value is determined for the node. As such, the random forest engine 206 may assign a higher weight to a connecting node, and also the downstream nodes in one or more paths including the connecting node, having lower quality values such that there is a higher chance that the item classification module 133 may obtain additional answers to those questions corresponding to the one or more paths downstream of the connecting node.

In addition, the random forest engine 206 may assign weights to the connecting nodes based on a likelihood that answers would be obtained from a consumer if the random forest engine 206 follows a path based on the connecting nodes. As shown in FIG. 5, the forest 252 includes two sub-branches 580 and 590 that have nodes with similar questions. Each of the sub-branches 580 and 590 include questions that probe the user for an intended use of the memory item, specifically, whether the memory is used in a desktop or a laptop, and whether the memory is used for a computer running a Windows® operating system or a Mac® operating system. The sub-branches 580 and 590 differ from each in that the order of the questions are different. Specifically, following the sub-branch 580, the consumer would be asked whether the memory is used for a computer running a Windows® operating system or a Mac® operating system first before being asked whether the memory is used in a desktop or a laptop. By contrast, following the sub-branch 590, the consumer would be asked whether the memory is used in a desktop or a laptop first before being asked whether the memory is used for a computer running a Windows® operating system or a Mac® operating system. Different orders of asking the same questions may elicit different response rate as consumers in general may prefer a particular order of questioning over another. As such, based on the rate of answers being obtained from consumers (e.g., how many times answers are obtained from consumers when the questions are asked in the order of a particular sub-branch), the random forest engine 206 may assign a responsive score to the particular sub-branch (or the branch root of the sub-branch, such as the nodes 506 and 520). For example, the responsive scores may be initialized as 0 for every node, and the responsive score for the particular sub-branch or the branch root of the sub-branch may be increased by 1 each time answers are obtained from a consumer when the particular sub-branch is traversed and decreased by 1 when answers are not obtained from a consumer when the particular sub-branch is traversed. Thus, a higher score is assigned to the sub-branch having a higher response rate, and a lower score is assigned to the sub-branch having a lower response rate.

In some embodiments, instead of selecting the next connecting node based on weights, the random forest engine 206 may select the next connecting node based on an answer provided by the consumer 140. For example, when the questions presented to the user is a multiple choice questions (e.g., "which operating system is running on the computer for which the memory is used?" corresponding to node 506), the random forest engine 206 may select the next connecting node (e.g., node 508 or node 514) based on the answer provided by the consumer 140.

Referring back to FIG. 3, once a connecting node is selected, the process 300 presents (at step 325) on a user device questions corresponding to the node(s) on the selected path and obtains (at step 330) answers to the questions via the user device. For example, from the root node 502, the random forest engine 206 may select the connecting node (the tree root) 504, among the connecting nodes (tree roots) 504, 540, and 548, and then select the connecting node 506, between the connecting nodes 506 and 520, using the techniques described herein. In this example, the node 506 includes a question "is the memory item used for a computer?" Thus, the item classification manager 202 may present the question to the consumer 140, for example, via an interface provided on the user device 110. In some embodiments, the item classification manager 202 may present the questions via the payment interface provided on the website of the payment service provider. Referring back to FIG. 4, after the merchant server 120 invokes the API for initiating a payment transaction request, the user 140 is redirected from the website of the merchant to the website of the payment service provider, where the user 140 may log in to an account with the payment service provider. Once the user 140 is logged in, the item classification manager 202 may present the question on the payment interface, prior to processing the payment request.

As the user 140 provides answers to the questions via the interface, the random forest engine 206 may store the answers in the corresponding nodes (or associating the answers with the corresponding nodes) and may continue to select the next connecting node(s) to traverse the forest 252 and present questions corresponding to the traversed node(s), until a leaf node is reached. For example, after the user 140 answers "yes" to the question "is the memory item used for a computer?", the random forest engine 206 may select a next connecting node (e.g., the node 508) using the techniques described herein. The item classification manager 202 may then present the question "is the memory used for a computer running a Windows® operating system?" included in the node 508 to the user 140 via the interface.

In some embodiments, the random forest engine 206 may divert the user to a different path based on the answer(s) provided by the user. For example, when the random forest engine 206 receives the answer "no" to the question "is the memory used for a computer running a Windows® operating system?" included in the node 508, instead of continuing down the path to the next node (e.g., the node 510 or the node 512), the random forest engine 206 may change its path by switching from the node 508 to the node 514. The item classification manager 202 may then present the question "is the memory used for a computer running a Mac® operating system?" included in the node 514 via the interface.

Furthermore, the random forest engine may also divert the user to a different path when the answer provided by the consumer 140 is inconsistent with answers provided by one or more other consumers. For example, when the random forest engine 206 receives the answer "yes" to the question "is the memory used for a computer running a Windows® operating system?", the random forest engine 206 may determine that the answer provided by the consumer 140 is inconsistent with the answers obtained from one or more other consumers who purchased the same item having the same description 210 indicating that the memory is for a computer running a Mac® operating system. In this scenario, the random forest engine 206 may still change its path to the node 514 and may prompt the user 140 the questions "is the memory used for a computer running a Mac® operating system?" even though the user 140 has indicated that the memory is for a Windows® computer previously. In another example where the questions asked is a multiple choice question (e.g., "which operating system is running on the computer for which the memory is used?" corresponding to node 506), when the consumer 140 provides an answer that is inconsistent to the answers provided by other consumers and stored in the forest 252 (e.g., when the consumer 140 indicates the operating system is a Windows® operating system but all of the other users indicate Mac® operating system), the random forest engine 206 may prompt a question to ask them to verify the answer again.

After obtaining answers to the questions, the process 300 modifies (at step 335) the forest and updates tags based on the answers. In some embodiments, the random forest engine 206 may modify the forest 252 based on answers obtained from the consumer 140. For example, based on whether answers were provided by the user 140 and/or based on the answers provided by the user 140 (e.g., whether they are consistent with the answers stored in the nodes, etc.), the random forest engine 206 may adjust the weight(s) assigned to one or more nodes in the forest 252. The random forest engine 206 may also modify the paths (e.g., the nodes) within the forest 252 and/or modify the questions included in the nodes. For example, if it is determined that the number of answers (including the answers provided by the consumer 140) indicate that the memory is used for a Windows® computer exceeds a threshold (e.g., 10, 20, 50, etc.), the random forest engine 206 may remove the sub-branch that includes the nodes 514-518 from the forest 252.

In another example, when the random forest engine 206 determines that the answers provided by the consumer 140 (and possibly from other consumers) indicate that the memory item is neither for a Windows® computer nor a Mac® computer (e.g., receiving "no" answer to both questions corresponding to the nodes 508 and 514), the random forest engine 206 may connect the node 506 to a new node. The new node may include an open-ended question such as "what operating system is the memory product used for?" or may include an additional choice such as "is the memory used for a computer running a Linux® operating system?".

Instead of creating a new node, the random forest engine 206 of some embodiments may modify the question included in a node. For example, when the random forest engine 206 determines that the answers provided by the consumer 140 (and possibly from other consumers) indicate that the memory item is neither for a Windows® computer nor for a Mac® computer (e.g., receiving "no" answer to both questions corresponding to the nodes 508 and 514), the random forest engine 206 may change the question in the node 508 to either an open-ended question such as "what operating system is the memory product used for?" or may include an additional choice such as "is the memory used for a computer running a Linux® operating system?".

The item classification manager 202 may also update tags associated with the item. For example, when the answers provided by the consumer 140 indicates that the memory is used for a Windows® computer, the item classification manager 202 may update an item database to include the tag "Windows® computer" with the item.

Referring back to FIG. 3, the process 300 then determines (at step 340) whether the user is still active. The user is active when the user is responsive to answering questions via the interface (e.g., providing an answer to a question within a predetermined amount of time, such as 10 seconds). On the other hand, the user is no longer active when the user is no longer responsive to the questions (e.g., providing no response after presenting a question via the interface for a predetermined amount of time, such as 10 seconds) or when the user does not provide any interactions (e.g., moving the cursor, selecting an interactive item, etc.) on the interface. When it is determined that the user is still active, the process 300 reverts back to the step 320 to select another path in the forest for probing the user for additional information. On the other hand, when it is determined that the user is no longer active, the process 300 classifies (at step 345) the item based on the tags. For example, after the random forest engine 206 has traversed a path in the forest 252 and has reached a leaf node (e.g., the leaf node 510), the random forest engine 206 may revert back to the root node 502 and select another path for probing the consumer 140 for additional information. For example, the random forest engine 206 may use the randomization algorithm to select a connecting node between the tree roots 540 and 548 (the tree root 504 is excluded since it has already been traversed). The random forest engine 206 may then present questions and answers from the consumer 140 following the selected path.

The random forest engine 206 may stop traversing the forest 252 either when the user has become inactive (e.g., has stopped answering questions) or when all of the branches have been traversed. The item classification manager 202 may update a score associated with the consumer 140. For example, the score may indicate how much the consumer 140 has participated in the information probing process (e.g., how many questions for which the consumer 140 has provided answers). The score associated with the consumer 140 may correspond to an incentive provided to the consumer, such that the service provider server 130 may generate and transmit an incentive (e.g., a coupon) based on the score of the consumer 140. In some embodiments, the item classification manager 202 may also generate a veracity score for the consumer 140 indicating a trustworthiness of the answers provided by the consumer 140. For example, the veracity score generated for the consumer 140 may be based on how consistent the answers provided by the consumer with other answers provided by other users and stored in the forests (e.g., the forest 252). In one example, the veracity score may be generated based on a percentage that the answers provided by the consumer 140 matches the answers stored in the forests.

The item classification manager 202 may then generate an item classification for the item based on the tags associated with the item, where the tags are associated with the item based on the answers provided by the consumer 140 and possibly other consumers. In some embodiments, the item classification manager 202 may use a machine learning model (e.g., a neural network) to generate the item classification by using the tags as input values. For example, the item classification may include a universal product code (UPC). In other examples, the item classification may include a predetermined classification code used internally by the payment service provider. The tags that are associated with the item may be derived from answers provided by the consumer 140 and also answers provided by other consumers. For example, upon receiving another purchase transaction request from another consumer for a purchase of an item having the same item description (e.g., "memory") (and possibly from the same merchant), the item classification module 133 may use the same techniques described herein to probe the consumer for information about the item, such as by traversing the forest 252 and asking questions included in the nodes of the forest 252. The item classification module 133 may also update the tags associated with the item based on the answers provided by the different consumers. After generating the item classification based on the tags, the item classification module 133 may then provide the item classification to the risk analysis module 132 such that the risk analysis module 132 may use the item classification to assess a risk of the purchase transaction. For example, the risk analysis module 132 may authorize or deny the purchase transaction request based at least in part on the item classification. In some embodiments, the item classification manager 202 may also update the account database 136 to associate the consumer 140 with the generated item classification once the purchase transaction is processed.

In some embodiments, the item classification module 133 may also analyze the answers provided by the different consumers to assess a risk of a merchant and/or a consumer. For example, when it is determined that the answers provided by the different consumers (including the consumer 140) fail a consistency threshold (e.g., 60% consistent, 70% consistent, 80% consistent, etc.) or deviates from each other by a certain threshold, the item classification module 133 may determine that the item description (e.g., the description 210) provided by the merchant is misleading, and that the merchant may be involved in fraudulent activities. Thus, the item classification module 133 may increase a risk associated with that merchant.

In some embodiments, the item classification module 133 may compare the answers provided by the consumer 140 against the answers provided by one or more other consumers in the past. When it is determined that the answers provided by the consumer 140 fails a consistency threshold (e.g., 60% consistent, 70% consistent, 80% consistent, etc.) against the answers provided by the other consumers (or deviates from the other answers by a certain threshold), the item classification module 133 may determine that consumer 140 is not trustworthy and may increase a risk associated with the consumer 140.

Figure 6:
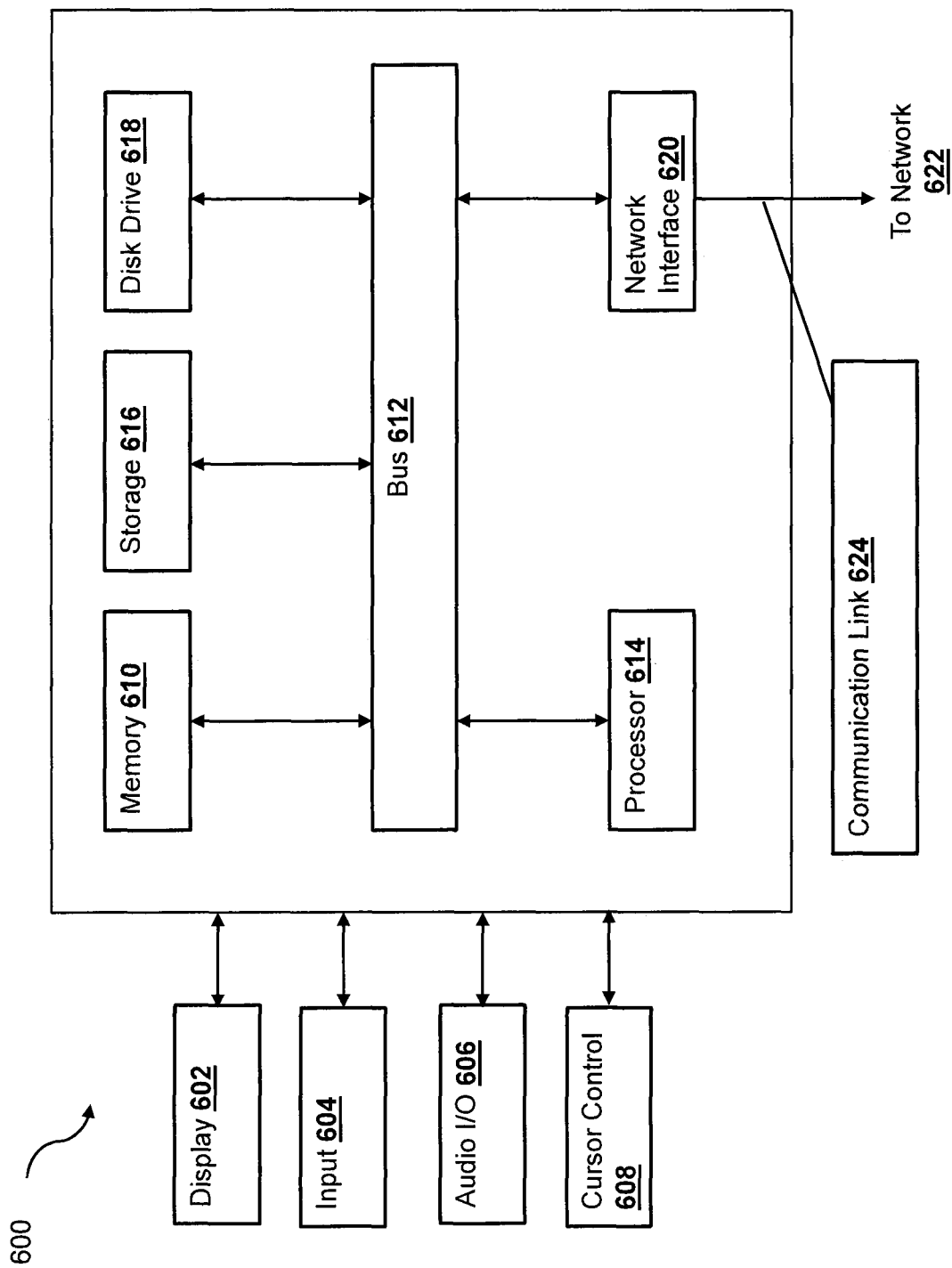
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the item classification functionalities described herein according to the process 300.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a processor;
   a network interface device; and
   a non-transitory computer-readable medium having stored thereon instructions executable to cause the system to perform operations comprising:
   receiving, from a server system, electronic information indicative of a transaction request for an electronic purchase of an item initiated by a user via a merchant interface presented on a user device, wherein the transaction request comprises description information corresponding to one or more characteristics of the item;
   determining that the description information does not satisfy a specified description criterion;
   in response to the determining, accessing a questionnaire data set corresponding to the description information, wherein the questionnaire data set comprises a root node and a plurality of paths extending from the root node, wherein each path in the plurality of paths comprises a set of nodes associated with a set of questions;
   selecting, from the plurality of paths, a particular path;
   redirecting the user device from the merchant interface to a questionnaire interface, wherein the questionnaire interface displays, to the user, a particular set of questions associated with a particular set of nodes included in the particular path;
   obtaining, via the questionnaire interface, a set of answers to the particular set of questions;
   generating identifying description information for the item based on the set of answers; and
   recording the identifying description information for the item in association with the transaction request.

2. The system of claim 1, wherein the operations further comprise:
   processing the transaction request based on the identifying description information, wherein the processing comprises authorizing or denying the transaction request.

3. The system of claim 1, wherein the operations further comprise:
   based on the identifying description information, associating the item with a specific identifier selected from a plurality of identifiers corresponding to a set of items available for purchase via the server system; and
   recording the specific identifier in association with the transaction request.

4. The system of claim 3, wherein the specific identifier is a universal product code (UPC).

5. The system of claim 1, wherein the identifying description information comprises information about one or more real-world physical characteristics of the item.

6. The system of claim 1, wherein the identifying description information for the item is generated using a machine learning model based on the set of answers to the particular set of questions.

7. The system of claim 1, wherein the operations further comprise:
   providing the identifying description information to a risk transaction model configured to evaluate a risk of the transaction request.

8. A method, comprising:
   receiving, at a computer system from a server system, electronic information indicative of a transaction request for an electronic purchase of an item initiated by a user via a merchant interface presented on a user device, wherein the transaction request comprises description information corresponding to one or more characteristics of the item;
   determining, by the computer system, that the description information does not satisfy a specified description criterion;
   in response to the determining, the computer system accessing a questionnaire data set corresponding to the description information, wherein the questionnaire data set comprises a root node and a plurality of paths extending from the root node, wherein each path in the plurality of paths comprises a set of nodes associated with a set of questions;
   selecting, from the plurality of paths, one or more paths;
   the computer system redirecting the user device from the merchant interface to a questionnaire interface, wherein the questionnaire interface displays, to the user, a particular set of questions associated with a particular set of nodes included in the one or more paths;

obtaining, via the questionnaire interface, a set of answers to the particular set of questions;

generating identifying description information for the item based on the set of answers; and recording the identifying description information for the item in association with the transaction request.

9. The method of claim 8, wherein the generating the identifying description information is further based on information about an intended use for the item, and wherein the particular set of questions includes a query for the user regarding the intended use.

10. The method of claim 8, wherein the specified description criterion is satisfied when the item can be matched with a particular predetermined item category or an item identifier without additional information.

11. The method of claim 8, further comprising:

based on the identifying description information, associating the item with a specific identifier selected from a plurality of identifiers corresponding to a set of items available for purchase via the server system; and recording the specific identifier in association with the transaction request.

12. The method of claim 11, wherein the specific identifier is a universal product code (UPC).

13. The method of claim 8, wherein the identifying description information comprises information about one or more real-world physical characteristics of the item, wherein the one or more real-world physical characteristics include at least one of a capacity of the item, a dimension of the item, or an appearance of the item.

14. The method of claim 8, wherein the identifying description information for the item is generated using a machine learning model based on the set of answers to the particular set of questions.

15. A non-transitory computer-readable medium having stored thereon instructions executable by a computer system to cause the computer system to perform operations comprising:

receiving, from a server system, a transaction request for an electronic purchase of an item initiated by a user via a merchant interface presented on a user device, wherein the transaction request comprises description information corresponding to the item;

determining that the description information does not satisfy a specified description criterion;

in response to the determining, accessing a questionnaire data set corresponding to the description information, wherein the questionnaire data set comprises a root node and a plurality of paths extending from the root node, wherein each path in the plurality of paths comprises a set of nodes associated with a set of questions;

selecting, from the plurality of paths, a particular path;

causing a questionnaire interface that is different from the merchant interface to be presented on the user device, wherein the questionnaire interface displays, to the user, a particular set of questions associated with a particular set of nodes included in the particular path;

obtaining, via the questionnaire interface, a set of answers to the particular set of questions;

generating identifying information for the item based on the set of answers; and recording the identifying information for the item in association with the transaction request.

16. The non-transitory computer-readable medium of claim 15, wherein the operations further comprise:

altering the questionnaire data set based on the set of answers to the particular set of questions, wherein the altering comprises at least one of adding an additional node corresponding to an additional question to the particular path or modifying a question corresponding to a node in the particular set of nodes.

17. The non-transitory computer-readable medium of claim 15, wherein the identifying information for the item is generated using a machine learning model based on the set of answers to the particular set of questions.

18. The non-transitory computer-readable medium of claim 15, wherein the generating the identifying information is further based on information about an intended use for the item, and wherein the particular set of questions includes a query regarding the intended use.

19. The non-transitory computer-readable medium of claim 15, wherein the operations further comprise:

based on the identifying information, associating the item with a specific identifier selected from a set of identifiers corresponding to a set of items available for purchase via the server system; and recording the specific identifier in association with the transaction request.

20. The non-transitory computer-readable medium of claim 15, wherein the operations further comprise:

providing the identifying information to a risk transaction model configured to evaluate a risk of the transaction request.

* * * * *

UNITED STATES PATENT AND TRADEMARK OFFICE
CERTIFICATE OF CORRECTION

| | | |
|---|---|---|
| PATENT NO. | : 11,798,017 B2 | Page 1 of 1 |
| APPLICATION NO. | : 17/533108 | |
| DATED | : October 24, 2023 | |
| INVENTOR(S) | : Meng Shi, Chetan S. Desai and Suraj Belavalgidad | |

It is certified that error appears in the above-identified patent and that said Letters Patent is hereby corrected as shown below:

In the Claims

Claim 9, Column 23, Lines 12-13, change "a query for the user regarding the" to --a query regarding the--.

<div style="text-align: right;">

Signed and Sealed this
Fifth Day of December, 2023

Katherine Kelly Vidal
*Director of the United States Patent and Trademark Office*

</div>